United States Patent
Mertens et al.

(10) Patent No.: US 8,600,077 B2
(45) Date of Patent: Dec. 3, 2013

(54) AUDIO LEVEL CONTROL

(75) Inventors: Mark Jozef Willem Mertens, Eindhoven (NL); Ronaldus Maria Aarts, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1869 days.

(21) Appl. No.: 10/599,630

(22) PCT Filed: Mar. 31, 2005

(86) PCT No.: PCT/IB2005/051080
§ 371 (c)(1),
(2), (4) Date: Oct. 4, 2006

(87) PCT Pub. No.: WO2005/099252
PCT Pub. Date: Oct. 20, 2005

(65) Prior Publication Data
US 2007/0177743 A1    Aug. 2, 2007

(30) Foreign Application Priority Data

Apr. 8, 2004 (EP) ..................................... 04101456

(51) Int. Cl.
*H03G 3/00* (2006.01)
(52) U.S. Cl.
USPC ............. 381/107; 381/80; 381/104; 381/105
(58) Field of Classification Search
USPC ......... 381/104, 105, 109, 119, 17, 18, 19, 80, 381/81, 107; 700/94
See application file for complete search history.

(56) References Cited

U.S. PATENT DOCUMENTS

| | | | | |
|---|---|---|---|---|
| 4,464,781 A | * | 8/1984 | Kaneko et al. | 381/12 |
| 5,048,091 A | * | 9/1991 | Sato et al. | 381/107 |
| 5,054,077 A | * | 10/1991 | Suzuki | 381/109 |
| 5,222,150 A | * | 6/1993 | Tajima | 381/105 |
| 5,237,418 A | | 8/1993 | Kaneko | |
| 5,430,826 A | * | 7/1995 | Webster et al. | 704/200 |
| 5,539,741 A | | 7/1996 | Barraclough et al. | |
| 5,878,391 A | | 3/1999 | Aarts | |
| 6,084,974 A | * | 7/2000 | Niimi | 381/104 |
| 6,311,155 B1 | * | 10/2001 | Vaudrey et al. | 704/225 |

(Continued)

FOREIGN PATENT DOCUMENTS

| | | |
|---|---|---|
| EP | 1035732 A1 | 9/2000 |
| JP | 05019729 | 1/1993 |

(Continued)

OTHER PUBLICATIONS

Fujitsu General Co Ltd.: Voice Circuit of a Split Screen Display Device, Feb. 1996, pp. 1-7.
Toshiba Co., Ltd.: Multiscreen Image Receiving Device, Mar. 2000, pp. 1-16.

*Primary Examiner* — Xu Mei (57) ABSTRACT

A device (1) is arranged for controlling the sound levels of a group of audio channels including a user selected main channel (MC) and at least one auxiliary channel (AC1; AC2). The audio channels can be rendered simultaneously. The device comprises automatic level adjustment means (12, 13) for adjusting the sound level of the at least one auxiliary channel relative to the main channel. The level adjustment means (12, 13) may be arranged for adapting the respective sound levels to the content or signal characteristics of each associated audio channel.

25 Claims, 5 Drawing Sheets

(56) References Cited

U.S. PATENT DOCUMENTS

| | | | |
|---|---|---|---|
| 6,396,549 B1 * | 5/2002 | Weber | 348/734 |
| 6,590,618 B1 | 7/2003 | Park et al. | |
| 6,965,676 B1 * | 11/2005 | Allred | 381/104 |
| 7,349,548 B2 * | 3/2008 | Wang | 381/104 |
| 7,373,650 B1 * | 5/2008 | Rodriguez et al. | 725/41 |

FOREIGN PATENT DOCUMENTS

| | | |
|---|---|---|
| JP | 08051580 A | 2/1996 |
| JP | 2000069391 A | 3/2000 |
| JP | 2001125695 A | 5/2001 |
| JP | 2002165152 A | 6/2002 |
| WO | 0147247 A2 | 6/2001 |

* cited by examiner

AUDIO LEVEL CONTROL

The present invention relates to controlling multiple audio levels. More in particular, the present invention relates to a device for controlling the sound levels of a group of audio channels which can be rendered simultaneously.

In modern communication devices, such as television sets, it is often possible to render two or more audio channels simultaneously. A television set may, for example, be able to provide a "split-screen" arrangement in which the television screen is divided into two or more sections, each section displaying a different video channel. The corresponding audio channels may be rendered using different loudspeakers.

The sound level of these audio channels must be controlled in such a way that the viewer is able to listen to one or more channels, changing the sound level of the channels when a commercial break starts or when a particularly interesting topic or video item is announced.

U.S. Pat. No. 6,590,618 discloses a method and apparatus for changing a channel or varying a volume (sound) level of a television receiver having both a normal screen mode function and a multiple screen mode function. A remote control unit has a separate set of sound level keys for each of the multiple screens. Although the screen which would be shown in single screen mode is labeled "main picture", the sound levels associated with the multiple screens are independently controlled by the user. When the user wants to listen more closely to one of the multiple channels, (s)he has to both increase the sound level of that channel and/or reduce the sound level of the at least one other channel manually, using the separate control keys. It will be clear that this is impractical.

It is an object of the present invention to overcome these and other problems of the Prior Art and to provide a device for controlling the sound levels of a group of audio channels which is easier to use and facilitates the user control task.

It is another object of the present invention to provide an audio system comprising such a device for controlling the sound levels of a group of audio channels. Accordingly, the present invention provides a device for controlling the sound levels of a group of audio channels comprising a main channel and at least one auxiliary channel which can be rendered simultaneously, the device comprising:
  user controlled selection means for selecting the main channel, and
  automatic level adjustment means for adjusting the sound level of the at least one auxiliary channel relative to the main channel.

By providing, in accordance with the present invention, automatic level adjustment means for adjusting the sound level of the at least one auxiliary channel relative to the sound level of the main channel, there is no need for the user to control the sound level of the auxiliary channel(s).

In typical embodiments, the device of the present invention comprises user controlled level adjustment means, hereinafter called first level adjustment means, for adjusting the sound level of the main channel. As the automatic level adjustment means, hereinafter called second level adjustment means, are arranged for adjusting the auxiliary channel(s), the user has to control only a single channel, the main channel, in order to obtain a suitable overall sound level. This reduces both the amount of effort required by the user and the number of required keys on the (remote) control unit. In addition, the respective sounds levels of the channels may be weighted and/or mutually adjusted using various suitable techniques. In this way the interference of the various audio channels as experienced by the user may be significantly reduced.

It is noted that the user controlled (first) level adjustment means mentioned above are not essential and that embodiments of the device of the present invention can be envisaged in which the sound level of the main channel is fixed, or is controlled by level control means external to said device. Although the (second) level adjustment means for adjusting the sound level of the auxiliary channel(s) are specifically referred to as being automatic, the user controlled (first) level control means may in certain embodiments also provide automatic level adjustment in addition to user adjustment.

It is further noted that the audio channels mentioned above may be part of communication channels containing audio (sound), video (moving images), pictures (still images), text, and/or other content items. The present invention is particularly suitable for television (combined video and audio channels) but is not so limited and may also be applied in systems providing audio only.

The user controlled selection means allow a user to select one rendered (for example shown and/or played) channel as the main channel, all other rendered channels are designated auxiliary channels. The user will typically select as the main channel the channel which (s)he finds the most interesting to listen to.

In a preferred embodiment the selection means are arranged for selecting successive available channels in response to user input. This allows the user to step through a succession of available channels using only a single (hardware or software) button or key. Alternatively, or additionally, a plurality of buttons could be provided, one for each channel.

The first level adjustment means may be controlled by conventional sound level adjustment elements such as "volume up" and "volume down" buttons on a (remote) control unit. The second level adjustment means are automatic in that they do not necessarily require user control but adjust the level(s) of the auxiliary channel(s) in response to, for example, changes in the sound level of the main channel or an auxiliary channel. Although a virtually infinite number of different level(s) of the auxiliary channel(s) could be provided, it is preferred that the second level adjustment means provides a plurality of pre-set relative sound levels. In this way is it possible to quickly and conveniently step through a number of levels. These pre-set levels may differ in absolute and/or relative terms, where relative is multiplicative with respect to the level of the main channel. The said plurality of pre-set levels may be per channel and/or per user. In the latter case, each user may be provided with an individual series of pre-set levels.

The pre-set levels are preferably factory-set, but in an advantageous embodiment the pre-set relative sound levels may be altered by the user. This allows the sound levels of the auxiliary channels to be adapted to the user's preferences and/or hearing.

In a particularly advantageous embodiment, the second level adjustment means are arranged for adapting the respective sound levels to the content of each associated audio channel and/or to the sound source. That is, different levels or sets of levels may be applied, depending on whether the channel renders music, speech, or other audio content, and whether the sound source is cable, antenna, VCR (Video Cassette Recorder), DVD (Digital Video Disc) player, or any other source. Speech could be played louder than music, or vice versa, and sound originating from a cable source could be amplified while sound originating from a VCR could be attenuated. A detector could be provided for detecting sound characteristics of the audio content, and/or changes in associated video content, for example by motion or color analysis.

Such detectors are known per se, an exemplary speech detector is disclosed in U.S. Pat. No. 5,878,391. In particularly advantageous further embodiments, different levels or sets of levels are used for different types of music, such as classical, pop, folk, and hard rock.

In a particularly advantageous embodiment of the device of the present invention, the level adjustment means are arranged for adapting the respective sound levels to user preferences regarding the content of the channels. That is, user preferences with respect to content (movies, news items, commercials, etc.) may be stored and used to choose desired sound levels when such content is rendered.

It is possible to extract information from the channels indicating the type of music being provided by the channel, whereby the second level adjustment means can automatically set the corresponding level(s). Such information could be provided by the channels as meta-data, that is data describing the content of the channels, or could be derived from the content itself, using a suitable detector as mentioned above.

In a particularly advantageous embodiment, the second level adjustment means are arranged for adapting the respective sound levels to the signal characteristics of each associated audio channel. That is, the second level adjustment means of this embodiment are responsive to the signal characteristics and adjust the signal level(s) accordingly. In a particularly advantageous embodiment, for example, the second level adjustment means are arranged for speech detection. More in particular, the second level adjustment means may further be arranged for formant detection, prosody detection and/or keyword detection. This allows intelligent software to change the sound level when a news item or movie begins, for example.

It is noted that the device of the present invention preferably takes the signal characteristics of all channels into account, including the main channel, and adjusts the level(s) of the auxiliary channel(s) in response thereto.

In a particularly advantageous embodiment, the level adjustment means are arranged for temporarily adjusting the sound level of a channel in response to the content and/or signal characteristics of at least one channel. That is, the sound level may be raised for a duration of approximately one second or several seconds to alert the user to a particular content item, for example an announcement containing a certain key word, or a particular type of signal, such as speech. It is preferred that the raised sound level gradually reverts to its original state. In some embodiments both the increase and the decrease of the sound level are gradual. While the sound level of the channel containing the content item of interest may be temporarily raised, the sound levels of the other channel(s) being rendered may be temporarily lowered during the same time duration so as to make the content item concerned more audible.

In any of the embodiments mentioned above, the level(s) may be adjusted by merely proportionally adjusting the volume, for example by multiplying the audio signal with a gain factor which can be larger or smaller than 1. Additionally, or alternatively, the second level adjustment means may be arranged for clipping and/or filtering audio signals contained in the channels, preferably using "intelligent" clipping and/or filtering techniques. The audio signal level(s) may be compressed and/or limited (clipping) or may be adjusted in dependence of the particular frequencies of the signal (filtering). It will be understood that these techniques may be combined to achieve any desired level adjustment.

The various audio channels may be rendered by a single, common transducer, such as a loudspeaker. It is preferred, however, that the main channel and the at least one auxiliary channel are rendered by different transducers. This allows a spatial separation of the audio channels, thus making them easier to distinguish.

In a preferred embodiment, the main channel is rendered by a transducer which is centrally located with respect to the audio system of which it is part. This allows the main channel to be heard clearly and distinctly, in particular when the auxiliary channels are rendered by non-centrally located transducers, for example transducers located to the side(s) of an apparatus.

A particularly flexible embodiment of the device of the present invention is further provided with transducer selecting means for selecting one or more transducers which render the main channel and the auxiliary channel(s) respectively.

It will be clear to those skilled in the art that the above features of the device according to the present invention may be present in isolation or in combination. More in particular, any of the features discussed above may be provided in combination with one of more of the other features.

The present invention further provides a remote control unit for use with the device as defined above, the unit comprising selection interface components, such as buttons, for selecting the main channel. The remote control unit of the present invention may advantageously further comprise a first sound level interface component, such as a toggle stick, for setting a ratio of sound levels of rendered channels. Alternatively, or additionally, the remote control unit may further comprise second sound level interface components, such as knobs, for manually adjusting the sound levels of rendered channels.

The present invention additionally provides an audio system, preferably an audio-visual system, comprising a device as defined above. Such an audio system may suitably be constituted by a television set, a music center, or a home entertainment system (which may include a personal computer). A remote control unit for use with such an audio system is discussed above.

The present invention also provides a method of controlling the sound levels of a group of audio channels comprising a main channel and at least one auxiliary channel which can be rendered simultaneously, the method comprising the steps of:
  selecting, under user control, the main channel, and
  automatically adjusting the sound level of the at least one auxiliary channel relative to the main channel.

Typically, the method of the present invention further comprises the step of adjusting, under user control, the sound level of the main channel, although this step is not essential and may be omitted in some embodiments.

The present invention further provides a computer program product for carrying out the method defined above.

The present invention will further be explained below with reference to exemplary embodiments illustrated in the accompanying drawings, in which.

Figure 1:
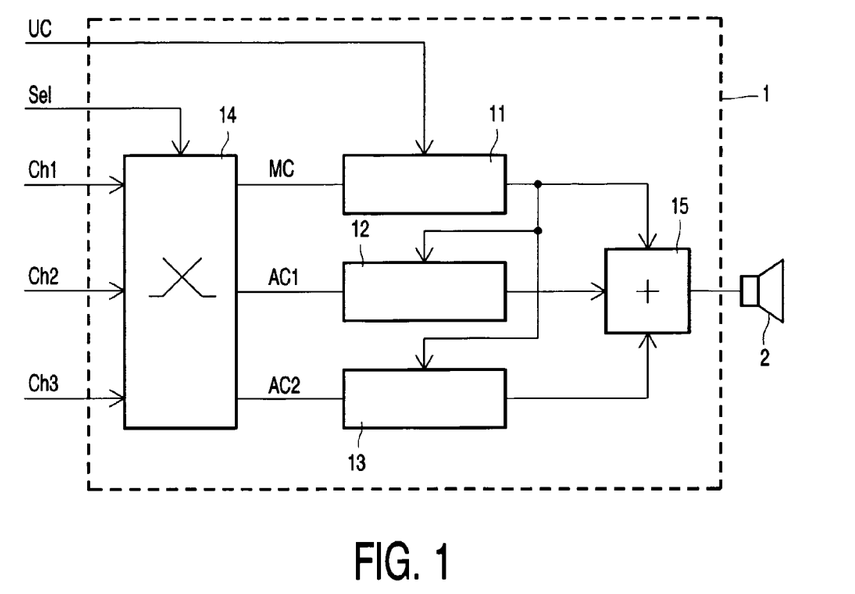
FIG. 1 schematically shows a first embodiment of a device according to the present invention.

The device 1 shown merely by way of non-limiting example in FIG. 1 comprises a first level adjustment unit 11, a second level adjustment unit 12 and a third level adjustment unit 13 arranged in parallel. The three channels Ch1, Ch2, and Ch3 are coupled to the inputs of the level adjustment units 11, 12 and 13 via a switching unit 14. The outputs of the level adjustment units 11, 12 and 13 are, in the exemplary embodiment shown, coupled to a signal addition unit 15 which, in turn, is coupled to a transducer (loudspeaker) 2 for rendering the audio signals of the three channels.

The channels Ch1, Ch2, and Ch3 may, for example, be constituted by multimedia channels containing both audio and video (sub-)channels. The audio channels contain audio signals which are associated with respective video channels containing video signals that are to be rendered simultaneously. Alternatively, or additionally, the channels Ch1, Ch2, and Ch3 may comprise one or more radio channels. The channels Ch1, Ch2, and Ch3 may be transmitted via radio, cable, telephone lines, or other communication means.

The switching unit 14, which is controlled by a selection signal Se1, connects one of the channels Ch1, Ch2, and Ch3 to each of the level adjustment units 11, 12 and 13. The selection signal Se1, which is typically initiated by a user, selects one of the channels Ch1, Ch2, and Ch3. The selected channel, labeled main channel MC, is fed to the first level adjustment unit 11, while the remaining channels, labeled first auxiliary channel AC1 and second auxiliary channel AC2, are fed to the second level adjustment unit 12 and the third level adjustment unit 13 respectively.

Instead of the three channels shown, four or more channels may be present, even when only three adjustment units are provided. In some embodiments, therefore, the number of channels may exceed the number of adjustment units. In such embodiments, an additional selection signal may be used to select the rendered channels out of the available channels.

The adjustment units 11, 12 and 13 receive control signals for adjusting the signal levels. The first level adjustment unit 11 receives a user control signal UC, while the second and third adjustment units 12 and 13 receive control signals that are (identical to or derived from) the output signal of the first adjustment unit 11. This output signal is the adjusted main channel (MC) signal. The user control signal UC typically comprises a numerical value (or an equivalent signal) representing a gain setting, for example a value ranging from 1 to 20.

As can be seen, the main channel MC can be adjusted under user control, while the auxiliary channels AC1 and AC2 are adjusted in dependence of the main channel. In this way, a change in the sound level of the main channel MC may automatically result in changes in the sound levels of the auxiliary channels.

Although the main channel may be exclusively user controlled, an embodiment can be envisaged in which the sound level of the main channel can be automatically adjusted in response to the sound level in the auxiliary channels, and/or in response to changes (for example the sound level, the sound type and/or the content) in the main channel itself. The sound level of the main channel may therefore be adjusted either upwards (sound level increase) or downwards (sound level decrease) and need not be fixed or solely determined by the user. Accordingly, the main channel may also be primarily user controlled. The level adjustment units 11, 12 and 13 will later be explained in more detail with reference to FIG. 3.

Figure 6:
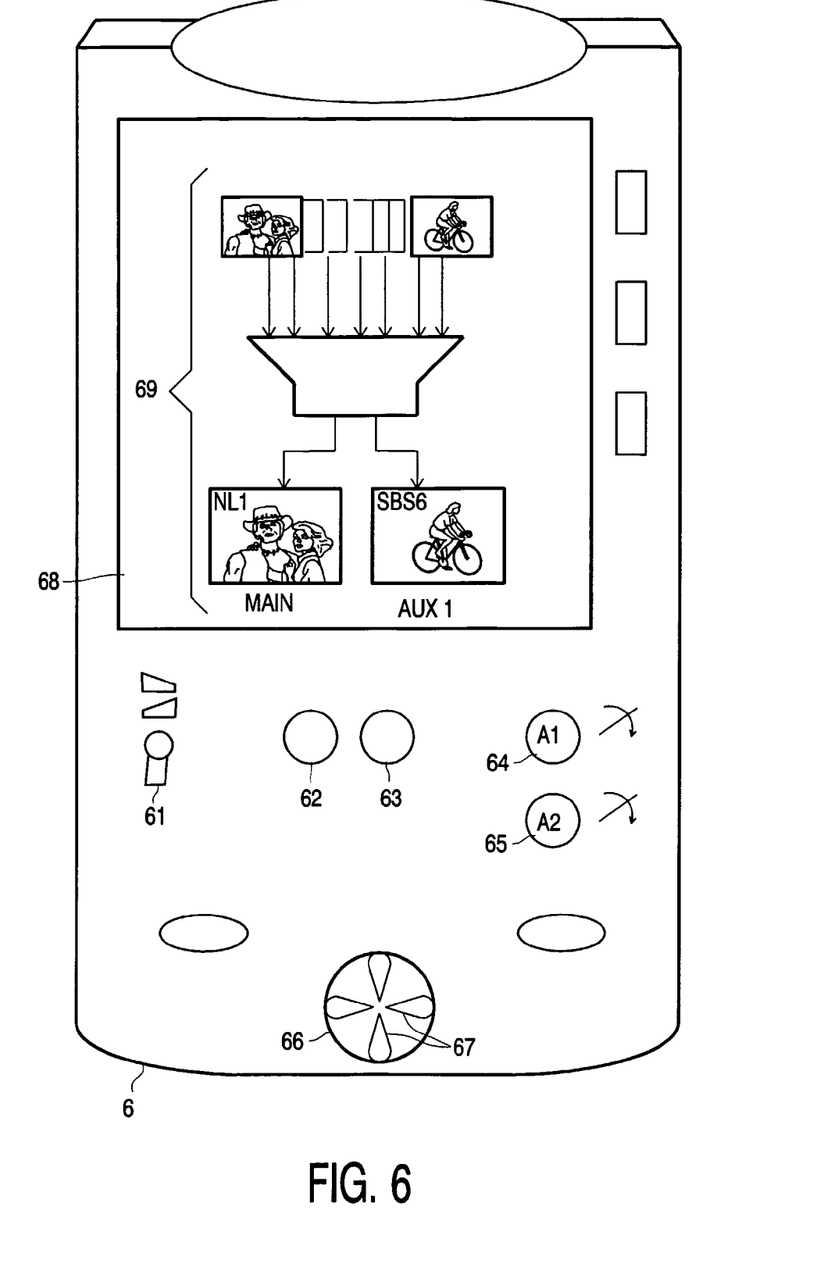
FIG. 6 schematically shows a remote control unit for use with the device of the present invention.

The selection signal Se1 and the user (level) control signal UC may originate from a (remote) control unit which is typically present in a television set or similar apparatus. In accordance with the present invention, such a remote control unit, an example of which is schematically shown in FIG. 6, comprises means for selecting the main channel.

Figure 2:
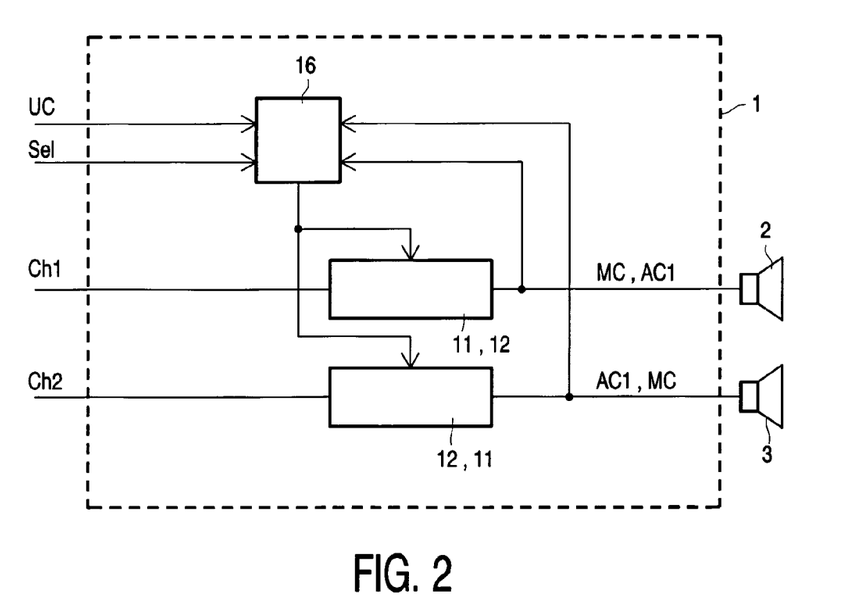
FIG. 2 schematically shows a second embodiment of a device according to the present invention.

In the exemplary embodiment of FIG. 2, the device 1 of the present invention is designed for two channels. Each channel Ch1, Ch2 is directly coupled to a respective level adjustment unit 11, 12. In contrast to FIG. 1, therefore, none of the level adjustment units shown is specifically dedicated to the main channel MC and either level adjustment unit can be the first level adjustment unit 11 or the second level adjustment unit 12. For this purpose, a selection unit 16 is provided which is controlled by the selection signal Se1. In a first mode, the selection unit 16 feeds the user control signal UC to the first level adjustment unit 11 and feeds the output signal of the first level adjustment unit 11 as a control signal to the second level adjustment unit 12. In a second mode, the selection unit 16 feeds the user control signal UC to the second level adjustment unit 12 and feeds the output signal of the second level adjustment unit 12 as a control signal to the first level adjustment unit 11. The selection unit 16 switches between these two modes under control of the user control signal UC.

As shown in FIG. 2, each level adjustment unit 11, 12 is connected to an individual transducer (loudspeaker) 2, 3. It will be understood that individual loudspeakers may also be employed in the embodiment of FIG. 1, in which case the signal addition unit 15 will be deleted. It is also possible to use one transducer (or set of transducers) for the main channel MC and another transducer (or set of transducers) for the combined auxiliary channels. Alternatively, a signal addition unit (15 in FIG. 1) may be used in the embodiment of FIG. 2.

Figure 3:
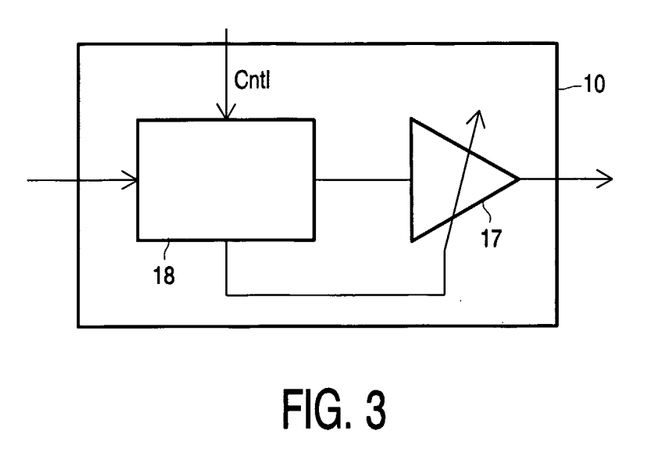
FIG. 3 schematically shows a first embodiment of a level adjustment unit for use in the device of FIGS. 1 and 2.

An exemplary embodiment of a level adjustment unit is schematically depicted in FIG. 3. The level adjustment unit 10 (which may correspond to any of the level adjustment units 11, 12 and 13 discussed above) comprises a controlled amplifier 17 and a level control unit 18. The level control unit 18 receives the signal of the channel concerned and passes it on to the controlled amplifier 17 while measuring one or more characteristics of the signal, such as its level (amplitude). The level control unit 18 also receives a control signal Cnt1, for example from the selection unit 16 shown in FIG. 2, or from another level adjustment unit. This control signal may for example be the user control signal UC produced by the user, the audio output signal of one of the other level adjustment units, the (preferably delayed) output signal of the level adjustment unit itself, and/or a combination thereof The level control unit 18 schematically illustrated in FIG. 3 may comprise suitable processing means for processing the control signal and the channel signal so as to produce a suitable amplifier control signal for the amplifier 17. These processing means may advantageously comprise a microprocessor and an associated memory. The memory may be used to store, among other things, pre-set and user adjusted sound levels, pre-set and user adjusted sound ratios, user preferences regarding content, and/or other information.

Various processing techniques may be used. The sound levels of the auxiliary channels may be set to a certain percentage of the main channel, for example 20%, 30% or 40% (these percentages may also be calculated on the basis of the total sound level produced by all channels together, in that case the main channel may, for example, be allocated 80% and the auxiliary channels 20% of the total sound volume). These percentages may be pre-set in the factory and may be based upon statistical user listening tests. Such tests may indicate which percentages yield a good intelligibility and/or a suitable channel balance.

The respective levels may be based upon a calculation of the total signal volume or signal power. For example, the signal power of the main channel may be calculated for a certain (typically short) time period using well-known techniques such as integrating the square of the amplitude over said time period. The same calculation is carried out for the auxiliary channel(s). If a certain target ratio of the signal powers (or volumes: the integral of the absolute value of the signal) is given, the adjustment is carried out in such a way that the actual ratio becomes (approximately) equal to the target ratio.

The level control unit 18 may therefore be provided with a division unit for dividing the sound (signal) levels of the level control units and determining a percentage (ratio). The level control unit 18 may further be provided with a comparison unit for comparing the calculated ratio with a predetermined (that pre-set or previously altered) ratio and deriving a compensation signal from any deviation.

In a particularly advantageous embodiment, the levels depend on the channel content and/or on the channel signal characteristics. With regard to content, different sound levels may be assigned to, for example, speech and music. A user will typically want to hear what is being said on the main channel and may accept a certain level of background music of an auxiliary channel. Conversely, when music is rendered on both the main channel and the auxiliary channel(s) and an auxiliary channel changes to speech, the user will typically want this auxiliary channel to be rendered louder in order to be able to hear and understand the speech. Accordingly, the present invention may advantageously provide automatic content type detection which may distinguish between, for example speech, music, noise and silence. In addition, different types of music may be distinguished, for example classical music, hard rock, jazz, blues, etc.

Determining the audio content of a channel can be carried out in various ways. Information (so called meta-information or meta-data) on the content may be available, for example the RDS (Radio Data System) information which may be broadcast together with radio signals and typically indicates the broadcasting station, the artist, and other information. Such meta-data may also be transmitted via other communication channels, such as the Internet. If this information includes the type of music, it can be used to determine the type of the audio content and adapt the levels of the channels accordingly. Other suitable information that may be used is EPG (Electronic Program Guide) information and/or the so-called ID3 tag of MP3.

Alternatively, or additionally, an indication of the audio content could be achieved using audio analysis such as speech detection and/or speech analysis. Speech analysis could, furthermore, involve prosody analysis and/or key word recognition, so that the device of the present invention may adapt the channel levels to user preferences. Other ways of determining content could be based upon the analysis of video or still images associated with the audio content, for example in the case of television.

Instead of, or in addition to (amplitude) level adjustment based upon content, level adjustment could be carried out on the basis of signal characteristics. Signal analysis involving, for example, average signal amplitude and dominant frequencies (spectral analysis) can assist in automatically choosing a suitable level adjustment. It will be understood that signal analysis may also assist in determining the content of the channels.

In the above discussion it has been assumed that the sound level adjustment of the various channels involved gain adjustment, that is, the signal of the channel is multiplied with a suitable gain factor (typically smaller than 1), resulting in the desired sound level. Although this is a very suitable technique, the present invention is not so limited. More in particular, the sound levels of the various channels may be reduced or adjusted using other techniques, such as clipping, compression and filtering. The clipping technique, which is known per se, involves limiting the signal amplitude to a certain threshold level. Although this technique may introduce some signal distortion, it is very simple and effective. Any signal distortion may be significantly decreased by "soft clipping", that is clipping in which the signal amplitude above the threshold value is (proportionally) reduced by multiplying the signal with a factor instead of "cutting off".

Another suitable technique which is known per se is filtering, which allows the signal amplitude to be reduced in dependence of the frequency. Using filtering, specific frequency ranges of the audio channels can be selectively reduced, instead of, or in addition to, adjusting the overall level of the channel. In this way it is possible to reduce the sound level in accordance with the sensitivity of the human ear: certain frequency ranges which cause more perceptual interference of simultaneously rendered sound (audio channels) could be reduced more than others frequency ranges.

The sound level as experienced by the human ear is not only determined by the actual signal power of the sound but also by psychological factors. This phenomenon can advantageously be used to provide "intelligent" sound level processing, as in the exemplary embodiment of FIG. 4.

Figure 4:
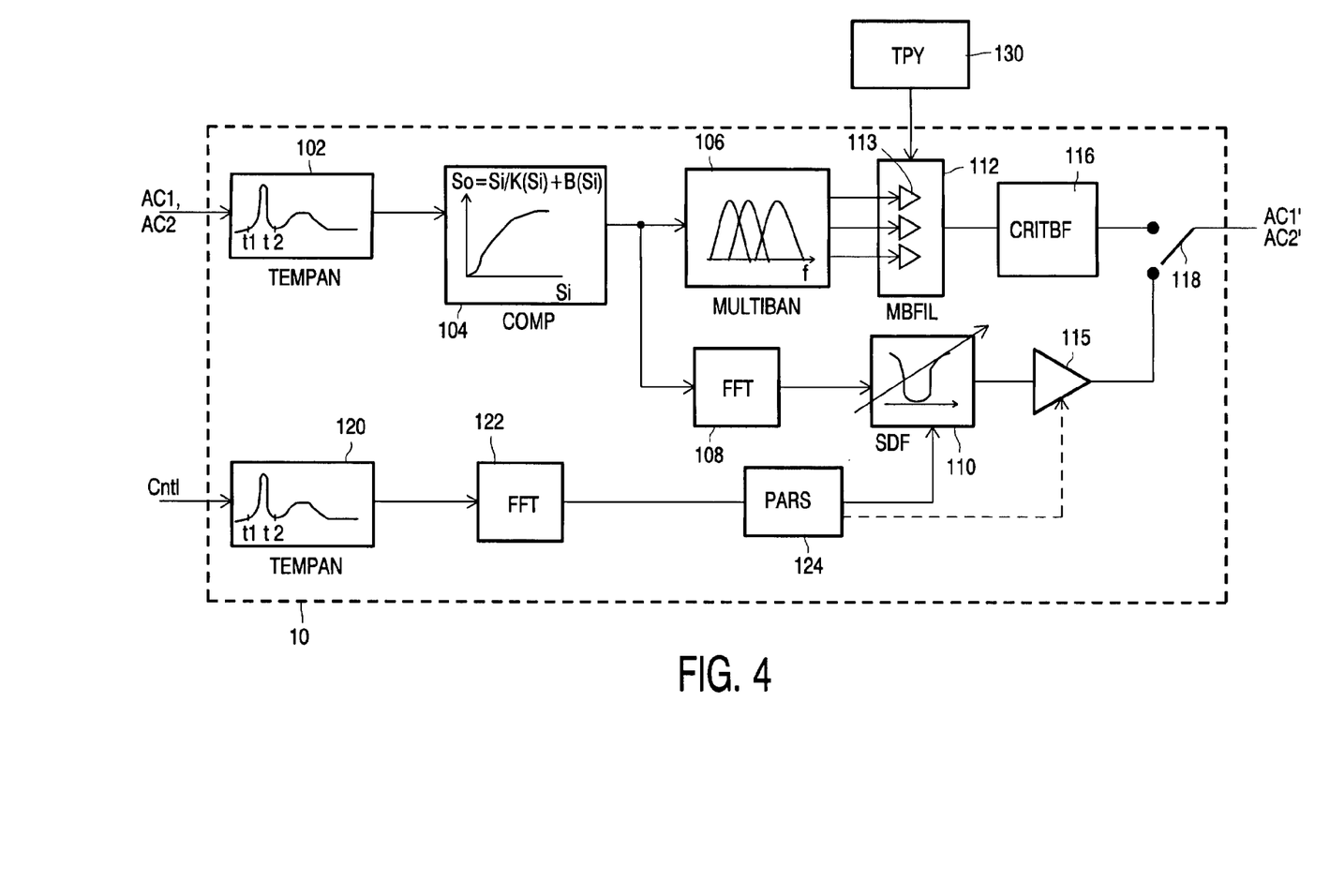
FIG. 4 schematically shows a second embodiment of a level adjustment unit for use in the device of FIGS. 1 and 2.

The sound level adjustment unit 10 of FIG. 4, which may correspond to any of the units 11, 12 and 13 of FIGS. 1 and 2, comprises in the exemplary embodiment shown a first temporal analysis (TEMPAN) module 102, a compressor (COMP) 104, a multi-band splitter (MULTIBAN) 106, a first fast Fourier transform (FFT) unit 108, a signal dependent filter (SDF) 110, a multi-band filter (MBFIL) 112, an (optional) controlled amplifier 115, a critical band filter (CRITBF) 116, a switch 118, a second temporal analysis module (TEMPAN) 120, a second fast Fourier transform (FFT) unit 122, and a parameter setting (PARS) unit 124. The level adjustment unit 10 receives type information from a type information unit (TPY) 130.

The first input signal of the unit 10 is the audio signal of an auxiliary channel AC1 or AC2, the perceptive sound level of which is to be reduced (it is noted that reducing the sound level of an auxiliary channel is substantially equivalent to increasing the sound level of the main channel as in both cases the relative sound level of the auxiliary channel is decreased).

The sound signal of the auxiliary channel AC1 or AC2 is temporally analyzed by the temporal analysis unit 102: the history of the signal is determined for a certain time period or "time slice", for example ranging from t1 to t2. The temporal analysis unit 102 is arranged for activating the other components of the unit 10 only for certain time periods. If there is a peak in the sound level (as schematically depicted in FIG. 4) between t1 and t2, it may be advantageous to process the audio signal only for this time slice, leaving the remainder of the signal level unchanged. This may typically occur during a commercial break in a television program, in which case so-called commercial detection by other means may help in automatically selecting the lowest of a set of user ratio preferences, for example a ratio of 100/0 (that is, main channel 100%, auxiliary channel 0%).

Subsequently, the audio signal may be compressed in its entirety, or for certain time slices only, by the compressor 104, thus imposing a compression relationship on the input levels to obtain the desired output levels. The compressor may optionally be controlled by the output signal of parameter setting unit 124, which in turn is derived from the control signal Cnt1.

The compressor 104 may use any suitable compression technique. In the example shown, a compression function is used which may be defined mathematically as:

$$S_0 = S_i / K(S_i) + B(S_i),$$

where $S_i$ is the input signal of the compressor 104 (in the present example, the audio signal of an auxiliary channel AC1 or AC2), $S_0$ is the output signal of the compressor 104, K is a scaling factor which may depend on the input signal $S_i$ and B is an addition factor which may also depend on the input signal $S_i$. Typically, K increases as $S_i$ increases, thus compressing high amplitude signals more than low amplitude signals. Compression techniques are well known in the art and the particular compression technique used is not essential to the present invention.

After being compressed, the audio signal may be filtered, for example using the multi-band splitter 106 and the relatively simple multi-band filter 112 which is arranged for filtering the signal per frequency band. The multi-band filter 112 may be provided with amplifiers 113 for each frequency band.

The filter characteristics of the multi-band filter 112 may be fixed, however, they can also be dependent on type information provided by a type determining unit 130 arranged for determining the type of the audio signal, for example pop music or classical music. In this way, the bass of pop music may be reduced by adjusting the gain of the respective amplifier 113 for the low frequency bands.

Additionally, or alternatively (as indicated by the switch 118), a Fourier transform may be calculated by the first Fourier transform unit 108, followed by fixed or adaptive frequency domain filtering by the frequency domain filter 110, which is, in the embodiment shown, a signal dependent filter. The filter 110 may be adapted in response to an adaptation signal which is derived from the control signal Cnt1 (see also FIG. 3), which may be the (level adjusted) audio signal of the main channel, as discussed above with reference to FIGS. 1 and 2. This adaptation signal is derived from the control signal Cnt1 using the second temporal analysis unit 120, the second fast Fourier transform unit 122 and the parameter setting unit 124. The filter 110 may for example suppress the (higher) amplitudes of audio frequency components in the channel AC1 or AC2 in a typical frequency band or in a frequency band which is actually determined by measurements. The output signal of the filter 110 is fed to an (optional) amplifier 115 which serves to compensate for any decrease in the (average) signal level caused by the filter 110. The output signal of the amplifier 115 (or, if the amplifier 115 is not present, the output signal of the filter 110) is fed to the switch 118 to be selectively coupled to the output of the unit 10.

It is noted that it may be advantageous to use a critical band filter 116 that has a filtering characteristic modeled in accordance with the human auditory system. The audio signals may, for example, be split up in accordance with the well-known critical band theory, and the audio levels of the auxiliary channels (and/or main channel) are changed in dependence on their (mutual) interferences in each critical band.

Figure 5:
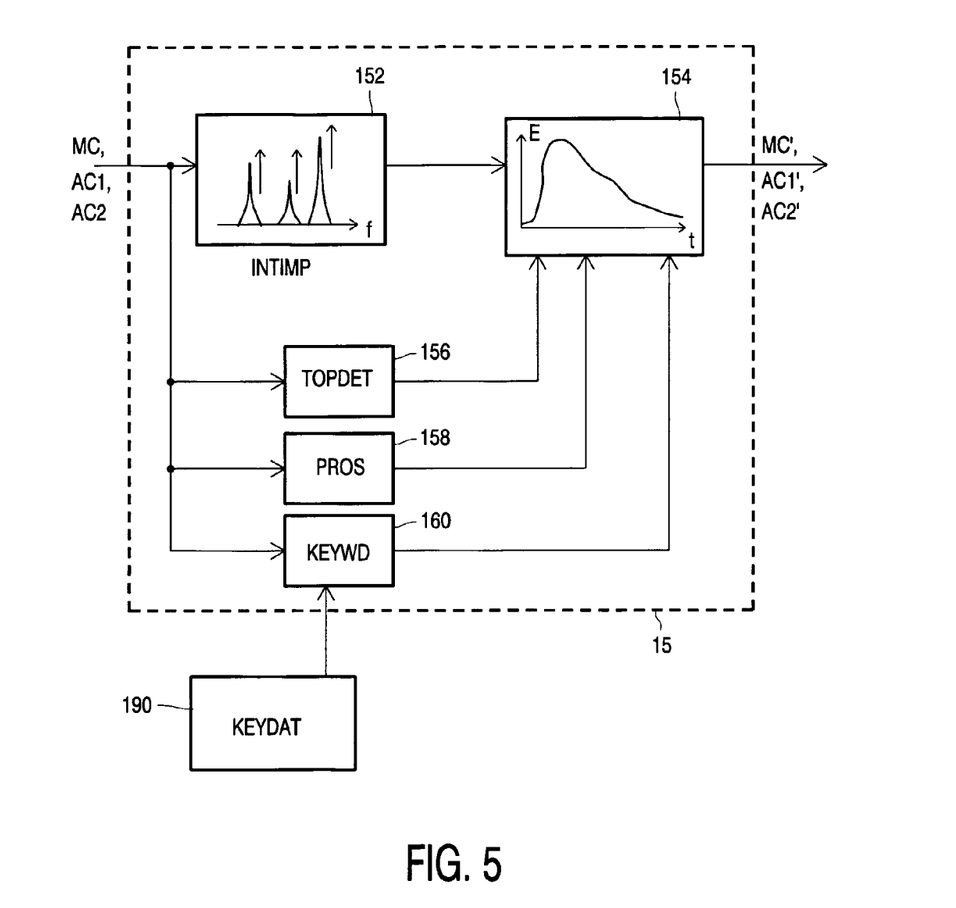
FIG. 5 schematically shows a third embodiment of a level adjustment unit according to the present invention.

The exemplary embodiment of a level adjustment module 15 schematically shown in FIG. 5 comprises an intelligibility improvement unit (INTIMP) 152, an envelope unit 154, a topic detector (TOPDET) 156, a prosody analyzer (PROS) 158 and a keyword detector (KEYWD) 160. The keyword detector 160 receives relevant keywords from a keyword database (KEYDAT) 190 which may be external to the unit 10. The level adjustment unit 15 may represent any of the level adjustment units 11, 12 and 13 shown in FIGS. 1 and 2. However, in contrast to the level adjustment units 10 of FIGS. 3 and 4, the unit 15 of FIG. 5 does not have a control input (Cnt1 in FIG. 3). The unit 15 of FIG. 5 as shown is therefore suitable for embodiments of the device according to the present invention in which user control (UC in FIG. 1) is not required or is achieved by other means. However, the control signal Cnt1 (see FIG. 3) could be fed to the intelligibility improvement unit 152. Alternatively, or additionally, the control signal Cnt1 could be fed to the topic detector 156, the prosody analyzer 158 and a keyword detector 160, instead of or in addition to the sound signals of the channels MC, AC1 and/or AC2.

The unit 15 is also suitable as an additional level control unit, arranged in series with a unit 10 of FIG. 3 or 4, for improving the intelligibility of speech before or after adjusting its level.

As illustrated in FIG. 5, the main channel MC and the auxiliary channels AC1 and AC2 (if present) may be level adjusted by the unit 15, resulting in level adjusted channels MC', AC1' and AC2'.

The audio signal contained in the channel (MC, AC1, AC2) of interest is improved by the intelligibility improvement module 152 by increasing the amplitudes of formants (as schematically illustrated in FIG., 5) or by other signal processing techniques known in the art. An envelope unit 154 then adjusts the envelope E of the improved audio signal. More in particular, the envelope unit 154 is preferably arranged for temporarily changing (increasing or decreasing) the envelope of the audio signal. To this end, the envelope unit 154 is provided with a controlled amplifier or equivalent means for adjusting the gain of the signal.

A preferred embodiment of the envelope unit 154 is arranged for increasing the sound level at certain moments of interest. These moments may be detected by a topic detector 156 which may be arranged to analyze the audio and video content of the channel and detect certain features, for example pauses in speech, pauses in motion, end of a video insertion, and reappearance of a central character (such as a news reader) by face detection and similar techniques.

A prosody analyzer 158 is provided for analyzing the prosody in the speech and enhancing the prosody by sending a suitable prosody enhancement signal to envelope unit 154.

Keywords may also be detected using the keyword detector 160 and the associated keyword database 190. The keyword database 190 is updated using, for example, EPG (Electronic Programming Guide) information summarizing the topics of television programs, and/or monitoring the interests of a user. If the rendering of a channel is suitably delayed, detected keywords may be rendered louder, thus alerting the user to these words.

The exemplary remote control unit 6 shown in FIG. 6 comprises a toggle stick 61, a channel selection button 62, a channel change button 63, (optional) auxiliary channel adjustment knobs 64 and 65, a ratio adjustment assembly 66 comprising four buttons 67, and a screen 68 on which a channel overview 69 is displayed. In the example shown, the remote control unit 6 operates a television set and/or a home video system.

Channel change button (key) 63 allows the channels being rendered to be changed by the user. In a typical embodiment, depressing the channel change button 63 repeatedly will result in the displayed channels to "rotate", that is, to displayed in succession. Depressing the selection button (key) 62 selects the current channel (NL1 in the example shown) as the main channel. This selection of the main channel will generate a selection signal (Se1 in FIGS. 1 and 2).

Alternatively, a keypad (not shown) may be provided to enter a channel number of a first channel to be rendered, depressing the channel selection button 62 will select this rendered channel as the main channel and generate the selection signal, after which any further channel number entered in the keypad will display the (first) auxiliary channel (SBS6 in the example shown). It will be understood that the manner in which two or more channels out of a plurality of channels are chosen is not essential to the present invention.

In the embodiment shown, the sound level ratio of the main channel and the auxiliary channel(s) may be adjusted by the user. To this end, the toggle stick 61, which essentially is a switch that can be moved from a central neutral position to either a left active position or a right active position, is arranged in such a way the user can step through a number of ratios. Assuming an initial situation in which the (factory set or programmed) ratio of the sound levels is 70/30 (that is, main channel 70% of total sound level, auxiliary channel 30%), moving the toggle stick to the left once may change the ratio into 80/20, and doing this twice may result in a ratio of 90/10. Similarly, moving the toggle stick to the right once may change the ratio from 70/30 into 60/40. The remote control unit may be arranged such that the ratio cannot exceed a threshold value, for example 50/50.

The remote control unit and/or the level adjustment units of the present invention may advantageously be designed such that activating the toggle stick 61, or any equivalent sound level interface component, causes a temporary balance adjustment which lasts for a duration of, for example, approximately one second or several seconds, after which the sound levels revert to their previous values.

In some embodiments using the toggle stick 61 may provide an alternative way of selecting the main channel, producing a selection signal Se1 when the ratio reaches 40/60, for example. Those skilled in the art will understand that various alternative or complementary arrangements are possible and that the toggle stick 61 is a useful but optional feature of the remote control unit 6.

Each newly selected ratio may be displayed, for example on a screen of the remote control unit or on the screen of an associated television set. Alternatively, an aural indication could be provided, for example an audible signal produced by a signal generator or a speech generator.

An alternative way of adjusting the ratio of the rendered channels is provided by (optional) auxiliary channel adjustment knobs 64 and 65. Rotating each of these knobs causes the level of the respective auxiliary channel to be adjusted. This manual adjustment is in addition to the automatic adjustment provided by the present invention. Embodiments can be envisaged in which the automatic adjustment overrides the manual adjustment or vice versa.

A further optional feature of the remote control unit 6 is the ratio adjustment assembly 66 which comprises four buttons 67. These buttons may serve to manually adjust sound levels (and/or sound level ratios) in the respective channels and to choose the channel to be adjusted.

It will be understood that the main channel selection button of a remote control unit according to the present invention is typically distinct from the usual channel selection buttons of a remote control which merely serve to select a channel to be rendered. The main channel selection button (or its equivalent) determines which channel of the channels being rendered simultaneously is to be the main channel, that is the channel under direct user control, in contrast to the auxiliary channels the levels of which are automatically controlled relative to the main channel.

It will further be understood that instead of using a remote control unit, other controls are possible. The device of the present invention could, for example, be provided with a speech command interpreter.

Figure 7:
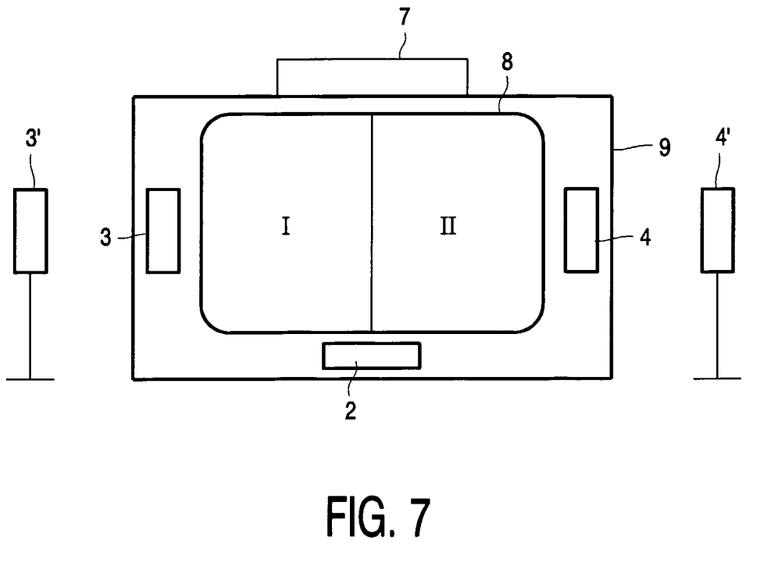
FIG. 7 schematically shows a home cinema system containing a device of the present invention.

As discussed above, the level adjusted audio channels can be rendered using a single, common transducer (such as a loudspeaker) or set of transducers reproducing summed signals, or using individual transducers or sets of the transducers for one or more channels. The main channel is preferably rendered using a separate transducer or set of transducers (it will be understood that a set of transducers may comprise, for example, a woofer and a tweeter, or other combinations of loudspeakers, resonators and/or other transducers). In a particularly advantageous embodiment, the main channel is rendered using a centrally located transducer (or set of transducers), while the auxiliary channel(s) is/are rendered using laterally located transducers (or sets of transducers). Such an arrangement is schematically shown in FIG. 7, where a television set 9 is provided with a centrally positioned loudspeaker 2 for rendering the main channel and four laterally positioned loudspeakers 3, 3', 4 and 4' for rendering the auxiliary channel(s). The television set 9 is further provided with a device (1 in FIGS. 1 and 2) according to the present invention. In the example shown, the television set has a screen 8 that is divided in two parts which are schematically indicated I and II. Each part is assigned a channel comprising both audio and video. As mentioned above, it is preferred that the central loudspeaker 2 renders the sound of the main channel which is displayed in, for example, screen section I, while the lateral loudspeakers 3 and 4 render the sound of the auxiliary channel, the video of which is in this example rendered by screen section II.

The television set 9 shown in FIG. 7 is part of a home cinema system which further comprises a set-top box 7 and stand-alone loudspeaker units 3' and 4.

The present invention is based upon the insight that the sound levels of several audio channels which can be rendered simultaneously should be controlled interdependently: adjusting the sound level of one channel may require the adjustment of one or more other channels. The present invention benefits from the further insight that user control of multiple channel is facilitated if the user has to control the sound level of a single, main channel only, all other channels being controlled automatically in dependence of the main channel.

The term computer program product should be understood to include any physical realization, e.g. an article of manufacture, of a collection of commands enabling a processor—generic or special purpose—, after a series of loading steps to get the commands into the processor, to execute any of the characteristic functions of an invention. In particular the computer program product may be realized as program code, processor adapted code derived from this program code, or any intermediate translation of this program code, on a carrier such as e.g. a disk or other plug-in component, present in a memory, temporarily present on a network connection—wired or wireless—, or program code on paper. Apart from program code, invention characteristic data required for the program may also be embodied as a computer program product.

It is noted that any terms used in this document should not be construed so as to limit the scope of the present invention. In particular, the words "comprise(s)" and "comprising" are not meant to exclude any elements not specifically stated.

Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A remote control unit for use with a device for controlling the sound levels of a group of audio channels having a main channel (MC) and at least one auxiliary channel (AC1) which can be rendered simultaneously, the device including user controlled selection means for selecting the main channel, and automatic level adjustment means for adjusting the sound level of the at least one auxiliary channel relative to the main channel, the remote control unit comprising:
   a first user-operable control device for selecting the main channel (MC); and
   a second user-operable control device which responds to a user control to toggle among a plurality of pre-set relative sound level ratios between the main channel (MC) and the at least one auxiliary channel (AC1).

2. The remote control unit of claim 1, wherein the second user-operable control device is a toggle stick configured such that when a user moves the toggle stick in a first direction, the device switches to a one of the plurality of pre-set relative sound level ratios that is greater than a pre-set relative sound level ratio that was selected prior to moving the toggle stick in the first direction, and when the user moves the toggle stick in a second direction opposite the first direction, the device switches to a one of the plurality of pre-set relative sound level ratios that is less than a pre-set relative sound level ratio that was selected prior to moving the toggle stick in the second direction.

3. The remote control unit of claim 1, wherein the second user-operable control device is a toggle stick configured such that when a user moves the toggle stick, the device temporarily selects a new one of the plurality of pre-set relative sound level ratios that has a different value compared to a pre-set relative sound level ratio that was selected prior to moving the toggle stick, and after a fixed period of time, automatically selects again the pre-set relative sound level ratio that was selected prior to moving the toggle stick.

4. A device, comprising:
   a first input adapted to receive a first audio signal;
   a second input adapted to receive a second audio signal;
   a selection device adapted to receive a user selection signal and in response thereto to select one of the first and second audio signals as a main audio signal; and to select another of the first and second audio signals as an auxiliary audio signal; and
   an automatic adjustment unit adapted to receive the auxiliary audio signal and to receive an auxiliary level control signal derived from the main audio signal, and in response thereto to automatically adjust a level of the auxiliary audio signal to have a particular ratio with respect to a level of the main audio signal.

5. The device of claim 4, wherein the selection device comprises:
   first and second inputs adapted to receive the first and second audio signals, respectively;
   a first output adapted to output the main audio signal;
   a second output adapted to output the auxiliary audio signal; and
   a switching device adapted, in response to the user selection signal, to selectively connect the first input to one of the first and second outputs, and to selectively connect the second input to another one of the first and second outputs.

6. The device of claim 4, further comprising a main audio adjustment unit adapted to receive a main level control signal and in response thereto, to adjust the level of the main audio signal.

7. The device of claim 6, and wherein the selection device comprises:
   a first input adapted to receive an output of the main audio adjustment unit;
   a second input adapted to receive an output of the auxiliary audio adjustment unit;
   a third input adapted to receive the main level control signal; and
   a fourth input adapted to receive the user selection signal,
   wherein in response to the user selection signal, the selection device supplies the auxiliary level control signal as a control input to the auxiliary audio adjustment unit, and supplies the main level control signal as a control input to the main audio adjustment unit.

8. The device of claim 4, wherein the particular ratio is stored in a memory of the device.

9. The device of claim 8, wherein the memory stores a plurality of ratios, and the device selects one of the ratios to be the particular ratio.

10. The device of claim 9, wherein the device selects one of the ratios to be the particular ratio in response to metadata that identifies a type of audio content included in at least one of the main audio signal and the auxiliary audio signal.

11. The device of claim 9, wherein the device determines a frequency spectrum characteristic of at least one of the main audio signal and the auxiliary audio signal and in response thereto selects one of the ratios to be the particular ratio.

12. The device of claim 4, wherein the automatic adjustment unit comprises:
   a level control unit; and
   an adjustable gain amplifier adapted to amplify the auxiliary audio signal,
   wherein the level control unit is adapted to provide a gain control signal for controlling a gain of the adjustable gain amplifier.

13. The device of claim 12, wherein the level control unit is adapted to receive the auxiliary audio signal and to receive the auxiliary level control signal derived from the main audio signal, the level control unit comprising:
   a division unit adapted to determine an actual ratio of the level of the auxiliary audio signal and the level of the main audio signal; and
   a comparison unit for comparing the actual ratio to the particular ratio and in response thereto to provide the gain control signal for controlling the gain of the adjustable gain amplifier to make the actual ratio equal to the particular ratio.

14. The device of claim 13, further comprising a processor adapted to determine the level of the auxiliary audio signal and the level of the main audio signal, wherein the processor is adapted to determine the level of the auxiliary audio signal by calculating a signal power of the auxiliary audio signal over a set time period, and wherein the processor is adapted to determine the level of the main audio signal by calculating a signal power of the main audio signal over the set time period.

15. The device of claim 4, further comprising:
   a first output for outputting the main audio signal to a first transducer; and a second output for outputting the auxiliary audio signal to a second transducer separate and spaced apart from the first transducer.

16. The device of claim 4, wherein the automatic adjustment unit is adapted to change the particular ratio from a first value to a second value temporarily in response to a characteristic being present in audio content included in at least one of the main audio signal and the auxiliary audio signal, and automatically changing the particular ratio back to the first value when the characteristic is no longer present in the audio content.

17. The device of claim 4, further comprising a video display screen, wherein the video display screen is adapted to be divided into at least a first part for displaying a first video program associated with the first audio signal, and a second part for displaying a second video program associated with the second audio signal.

18. A method, comprising:
receiving a first audio signal;
receiving a second audio signal;
receiving a main level control signal;
receiving a user selection signal identifying a selected one of the first and second audio signal to be a main audio signal, the other of the first and second audio signals being non-selected;
in response to the user selection signal, connecting the selected one of the first and second audio signals to a main audio adjustment unit, and connecting the non-selected one of the first and second audio signals to an auxiliary audio adjustment unit;
adjusting a level of the main audio signal by means of the main audio adjustment unit in response to the main level control signal; and
automatically adjusting a level of the auxiliary audio signal by means of the auxiliary audio adjustment unit to have a particular ratio with respect to the level of the main audio signal.

19. The method of claim 18, further comprising retrieving the particular ratio from a memory device.

20. The method of claim 19, further comprising:
storing a plurality of ratios in the memory device; and
selecting one of the ratios to be the particular ratio.

21. The method of claim 20, wherein selecting one of the ratios to be the particular ratio comprises:
receiving metadata that identifies a type of audio content included in at least one of the main audio signal and the auxiliary audio signal; and
selecting the particular ratio in response to the metadata.

22. The method of claim 20, wherein selecting one of the ratios to be the particular ratio comprises:
determining a frequency spectrum characteristic of at least one of the main audio signal and the auxiliary audio signal; and
selecting the particular ratio in response to the determined frequency spectrum characteristic.

23. The method of claim 18, further comprising:
determining an actual ratio of the level of the auxiliary audio signal and the level of the main audio signal; and
comparing the actual ratio to the particular ratio; and
controlling the gain of an adjustable gain amplifier in the auxiliary audio adjustment unit to make the actual ratio equal to the particular ratio.

24. The method of claim 23, further comprising:
calculating a signal power of the auxiliary audio signal over a set time period; and
calculating a signal power of the main audio signal over the set time period.

25. The method of claim 19, further comprising:
changing the particular ratio from a first value to a second value temporarily in response to a characteristic being present in audio content included in at least one of the main audio signal and the auxiliary audio signal; and
automatically changing the particular ratio back to the first value when the characteristic is no longer present in the audio content.

\* \* \* \* \*